No. 773,307. PATENTED OCT. 25, 1904.
F. L. O. WADSWORTH.
MANUFACTURE OF GLASS ARTICLES.
APPLICATION FILED JUNE 22, 1904.
NO MODEL. 2 SHEETS—SHEET 1.

Witnesses
C. H. Walker
H. W. Corwin

Inventor
F. L. O. Wadsworth
by Bakewell & Byrnes
Attorneys

No. 773,307. PATENTED OCT. 25, 1904.
F. L. O. WADSWORTH.
MANUFACTURE OF GLASS ARTICLES.
APPLICATION FILED JUNE 22, 1904.
NO MODEL. 2 SHEETS—SHEET 2.
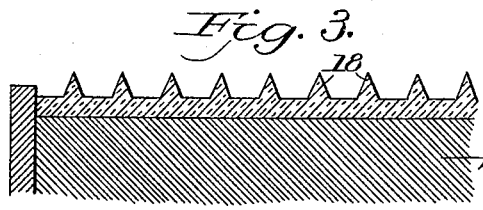
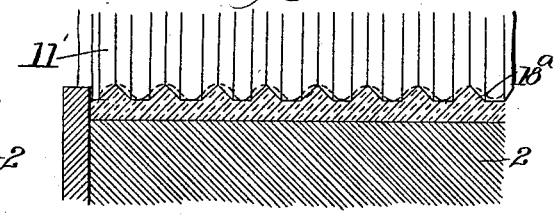
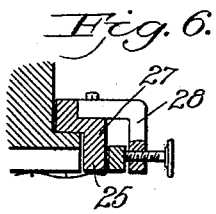
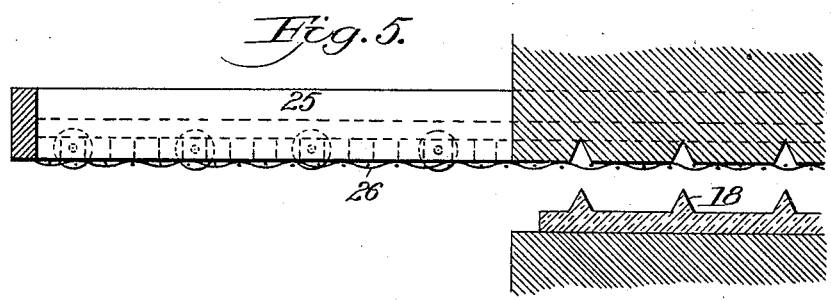
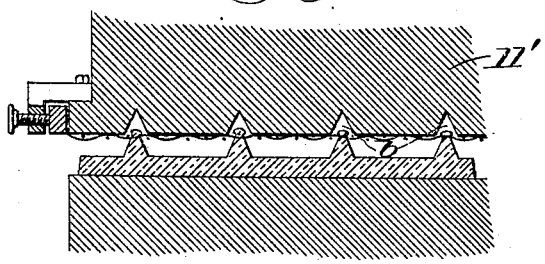
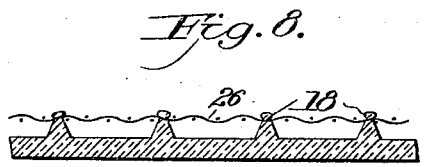
Witnesses
Inventor
F. L. O. Wadsworth
by Bakewell Byrnes
Attorneys No. 773,307. Patented October 25, 1904.

UNITED STATES PATENT OFFICE.

FRANK L. O. WADSWORTH, OF MORGANTOWN, WEST VIRGINIA, ASSIGNOR TO PRESSED PRISM PLATE GLASS COMPANY, OF MORGANTOWN, WEST VIRGINIA, A CORPORATION OF WEST VIRGINIA.

MANUFACTURE OF GLASS ARTICLES.

SPECIFICATION forming part of Letters Patent No. 773,307, dated October 25, 1904.

Application filed June 22, 1904. Serial No. 213,668. (No model.)

*To all whom it may concern:*

Be it known that I, FRANK L. O. WADSWORTH, of Morgantown, Monongalia county, West Virginia, have invented a new and useful Improvement in the Manufacture of Glass Articles, of which the following is a full, clear, and exact description.

Figure 1:
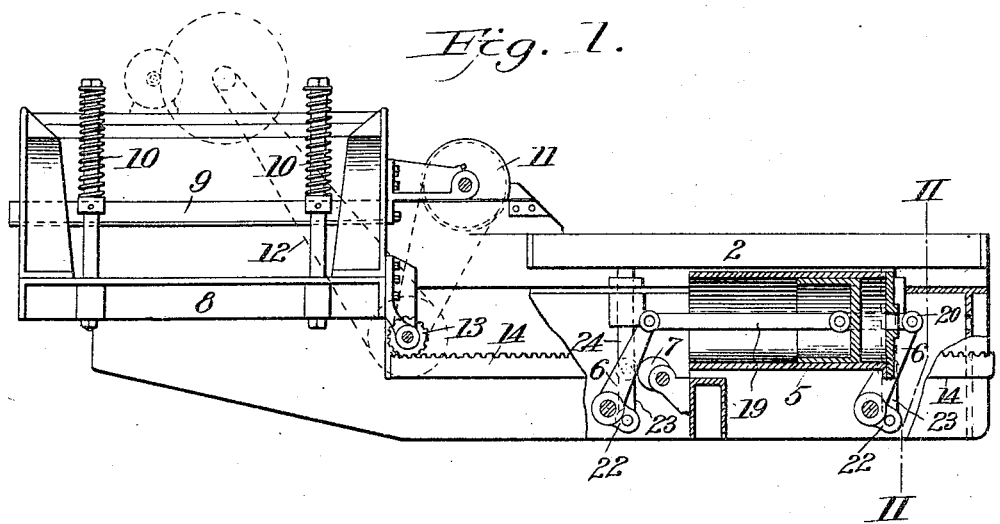
Figure 2:
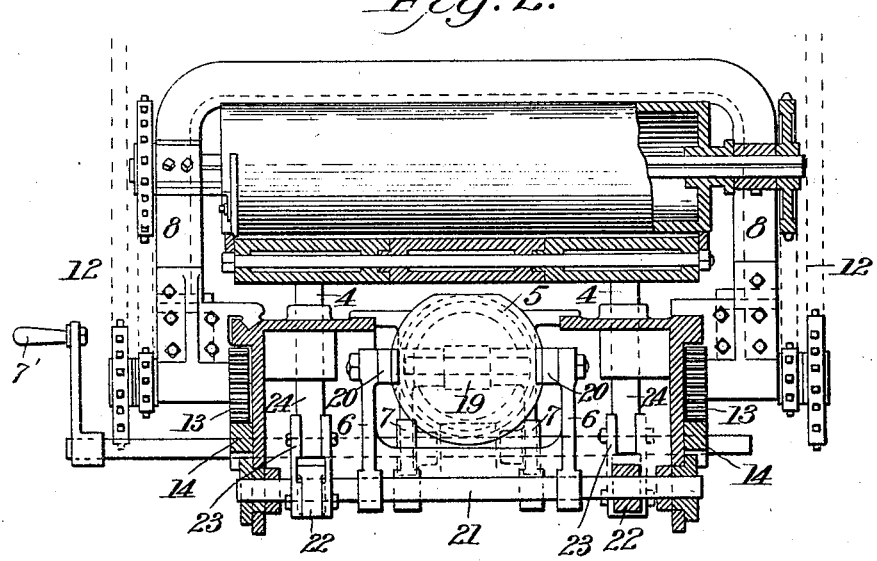

In the drawings, Figure 1 shows in side elevation, partly in vertical section, a machine adapted for the practice of my invention. Fig. 2 is a vertical cross-section on the line II II of Fig. 1, showing one end of the roll in section. Fig. 3 is a sectional view showing a glass plate with projecting ribs formed thereon by the machine shown in Fig. 1. Fig. 4 shows a grooved roller which may be employed in the preliminary operation of spreading the sheet preparatory to forming and shaping the projections thereon by pressing. Fig. 5 shows in section the molding-surface of the die changed preparatory to the final molding of the glass by the interposition of a wire mesh, which then forms part of the molding-surface and is forced upon the glass by the die. Fig. 6 shows in vertical cross-section means whereby the wire mesh is placed in position. Fig. 7 is a cross-sectional view illustrating the act of forcing the wire mesh upon the projections of the sheet. Fig. 8 shows the glass sheet, which is the product of the operations illustrated in Figs. 5 to 7. Fig. 9 shows a section of modified form of die which may be used in place of that shown in Figs. 1, 5, and 7; and Fig. 10 shows the article as produced by this modified form of die employed in same manner.

My invention is primarily designed for the manufacture of glass tiles having ribs or projections formed on the rear surface, which ribs are flattened or widened at their ends and inclose and hold a mesh, so as to form keys for holding the tiles to a bed of cement.

My invention in one of its features consists in an operation embodying at least three steps—namely, first spreading a body of glass into sheet form, then molding the sheet with projections or ribs on its surface, and then flattening the molded projections or ribs by embedding a wire mesh therein.

By the intermediate step of pressing the projections on the surface of the sheet before flattening or reshaping them I am enabled to secure projections which are very sharply defined and may be made narrow, whereas if this step were omitted and it were attempted to employ a two-step operation of rolling the projections and then flattening them the projections would be obtuse and badly defined and generally unfit for the purpose for which they are intended. By first spreading the sheet by rolling I am enabled to make the sheet of any desired size, and this could not be done if the preliminary rolling operation were omitted.

Figs. 1, 2, and 3 illustrate one form of the apparatus for the practice of my invention. In these figures, 2 is a table on which the body of plastic glass to be molded is placed. This table is mounted upon standards 4, adapted to be moved vertically, preferably by a cylinder 5 and intermediate connecting mechanism, which consists, preferably, of a pitman 19, connected with the piston and connected by levers 6 and rods 20 to shafts 21, which by levers 22 and links 23 are connected to vertical slides 24, by which the table is guided in its vertical motion. The cylinder is provided with suitable fluid-supply connnections, the rise of the table being effected by the admission of fluid and its descent being effected by gravity. The position of the table when at its lowest point is determined by an adjustable stop consisting, preferably, of an eccentric 7, which is adapted to be engaged by and to stop part of the connecting mechanism 6. 8 is a carriage on which a molding-plate 9 is mounted and is preferably backed yieldingly by springs 10, and on the carriage is a roll 11, which may have a plain face and is rotated by suitable power connections 12. The carriage is capable of horizontal motion to bring the roll 11 and plate 9 successively over the table 2, and for this purpose I may employ on the table driven pinions 13, which engage with stationary racks 14.

The operation is as follows: The table 2 is set in its lowest position permitted by the eccentric 7, which has been adjusted by a handle 7' to secure the desired thickness of glass, the plastic glass is placed thereon, and the carriage 8 is advanced so as to move the roll 11 over the glass and to spread it upon the table into a flat sheet. Farther advance of the carriage moves the roll beyond the table and brings over the glass the molding-plate 9, whose under surface is formed with grooves of suitable shape to impress upon the glass the desired ribs or projections. Then by actuating the cylinder 5 the table is raised and the glass sheet being pressed thereby against the plate 9 is molded with the projections or ribs 18. (Shown in Fig. 3.) The table is then lowered by reverse operation of the cylinder, and the stop 7 is adjusted, so as to permit it to descend farther than the position which it occupied during the operation of the roll.

In the modified apparatus (shown in Fig. 4) the roll 11' is formed with grooves, the purpose of which is not to form ribs or projections to final shape, but simply to make prominences on the sheet preliminary to the second step of molding with the die 9. The grooves of the die are brought directly above the prominences, so that the thickened portions of the glass at those places will more readily fill the grooves and enable the die to be made with deeper grooves than would otherwise be practicable. The presence of the prominences also enables the molding operation to be performed with the least possible displacement of the glass in the grooves, and this tends to secure sharper definition of the ribs on the finished sheet and to prevent molecular straining of the glass.

As shown in Figs. 5 and 6, the molding-surface of the die is changed between the second and third steps by interposing a sheet of wire fabric between the glass and the die-surface. I may do this by employing a frame 25, on which a sheet 26 of wire fabric may be stretched, the frame being adapted to be fitted to the sides of the die by interfitting slide-flanges 27, so that when thus applied the fabric 26 will be directly beneath the die-surface. The frame is placed on the end of the die before the first molding operation, and as soon as this operation is completed it may be slid horizontally along the die to bring the fabric directly under the die-surface. The glass and die are then brought together, the effect of which will be to cause the ribs on the glass to pass through the mesh of the fabric to some extent and to project above the same. This operation flattens the projections and causes a firm union between the fabric and the glass, as shown in Fig. 8, and the fabric will then serve as a locking-surface by which the glass may be applied securely to walls with plaster or cement. The fabric should be clamped by clamping mechanism 28 to the frame 25, so that at the end of the third step it may be detached from the frame preliminary to removing the glass from the apparatus.

In Fig. 9 I show a modified form of die in which the grooves which form the projections on glass are closer together and of such form that the glass will more readily enter therein on pressing. The form of the finished article produced by this form of die is shown in Fig. 10.

Within the scope of my invention as defined in the claims those skilled in the art will be able to modify in many other ways the means employed for carrying out the process, since

What I claim is—

1. The method of making glass articles which consists in the combination of at least the following three steps, namely; first, spreading the glass into a sheet, then pressing its surface to form projections thereon and then reshaping the surface of the projections, and simultaneously interlocking a mesh therewith; substantially as described.

2. An article of manufacture composed of a glass plate or sheet having wire embedded in the glass with projecting loops; substantially as described.

3. An article of manufacture consisting of a glass plate or sheet with surface projections, and wire held by the projections and affording intermediate loops; substantially as described.

In testimony whereof I have hereunto set my hand.

FRANK L. O. WADSWORTH.

Witnesses:
  THOMAS W. BAKEWELL,
  H. M. CORWIN.